United States Patent [19]

Kummer

[11] Patent Number: 5,181,995
[45] Date of Patent: Jan. 26, 1993

[54] ELECTROCHEMICAL PROCESS AND APPARATUS FOR REDUCING OXIDANTS OF VEHICLE INTERIOR AIR

[75] Inventor: Joseph T. Kummer, Ypsilanti, Mich.

[73] Assignee: Ford Motor Company, Dearborn, Mich.

[21] Appl. No.: 591,326

[22] Filed: Oct. 1, 1990

[51] Int. Cl.$^5$ ............................. C25B 1/02; C25B 9/00
[52] U.S. Cl. .................................... 204/101; 204/129; 204/253; 204/258; 204/265; 55/2
[58] Field of Search ............ 204/59 R, 129, 101, 204/292, 291, 294, 266, 283, 265, 264, 130, 253, 258; 55/2; 429/30, 31, 33

[56] References Cited

U.S. PATENT DOCUMENTS

| | | | |
|---|---|---|---|
| 2,298,607 | 10/1942 | Anderson | 23/4 |
| 3,616,339 | 10/1971 | Marziuff | 204/130 |
| 3,870,495 | 3/1975 | Dixson et al. | 55/309 |
| 4,184,983 | 1/1980 | Putz et al. | 252/466 PT |
| 4,537,840 | 8/1985 | Tsukui et al. | 429/33 |
| 5,034,023 | 7/1991 | Thompson | 429/34 |

FOREIGN PATENT DOCUMENTS 3740091 6/1989 Fed. Rep. of Germany.
2122103 1/1984 United Kingdom.

OTHER PUBLICATIONS

PCT International Application WO 85/01704, Heinz et al.

Primary Examiner—John Niebling
Assistant Examiner—Kathryn Gorgos

[57] ABSTRACT

A porous or nonporous hydrophilic, insoluble electrolyte allows a reducing condition to be produced at a negative electrode from a low content of moisture in the electrolyte and reduces oxidants by catalyzed production of water. A constant current with a low voltage is applied between a positive catalyzed electrode and a negative catalyzed electrode, each separated by a hydrophilic, insoluble, cationic exchange electrolyte therebetween containing moisture. The cell may consist of corrugated sheets of electrolyte, opposite sides of which may carry the catalytic electrode material; air to be treated is moved across the negative electrode only.

21 Claims, 3 Drawing Sheets

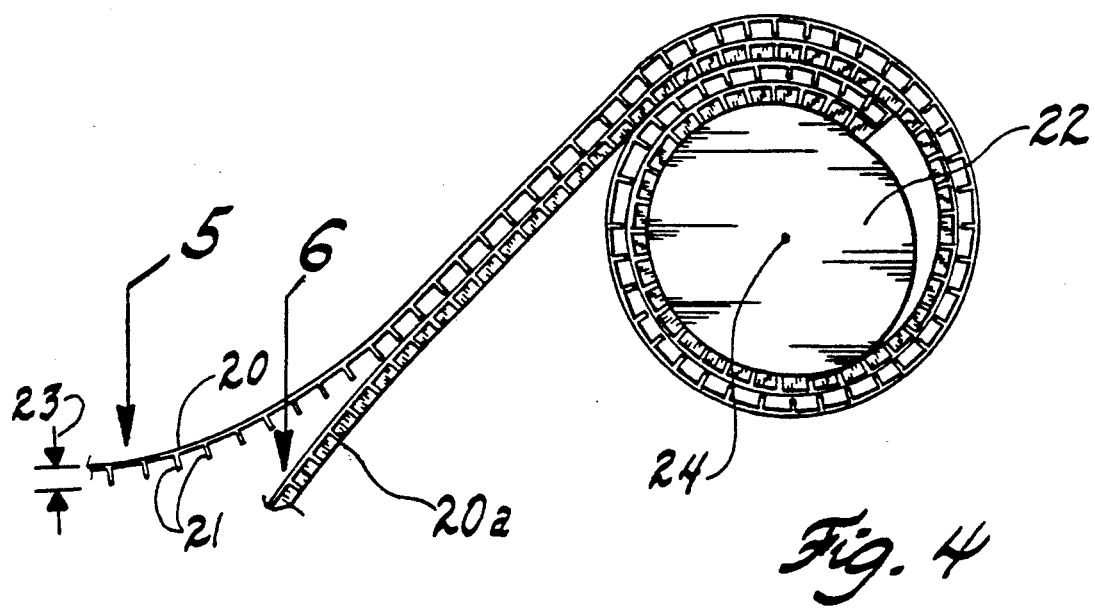
Fig. 4
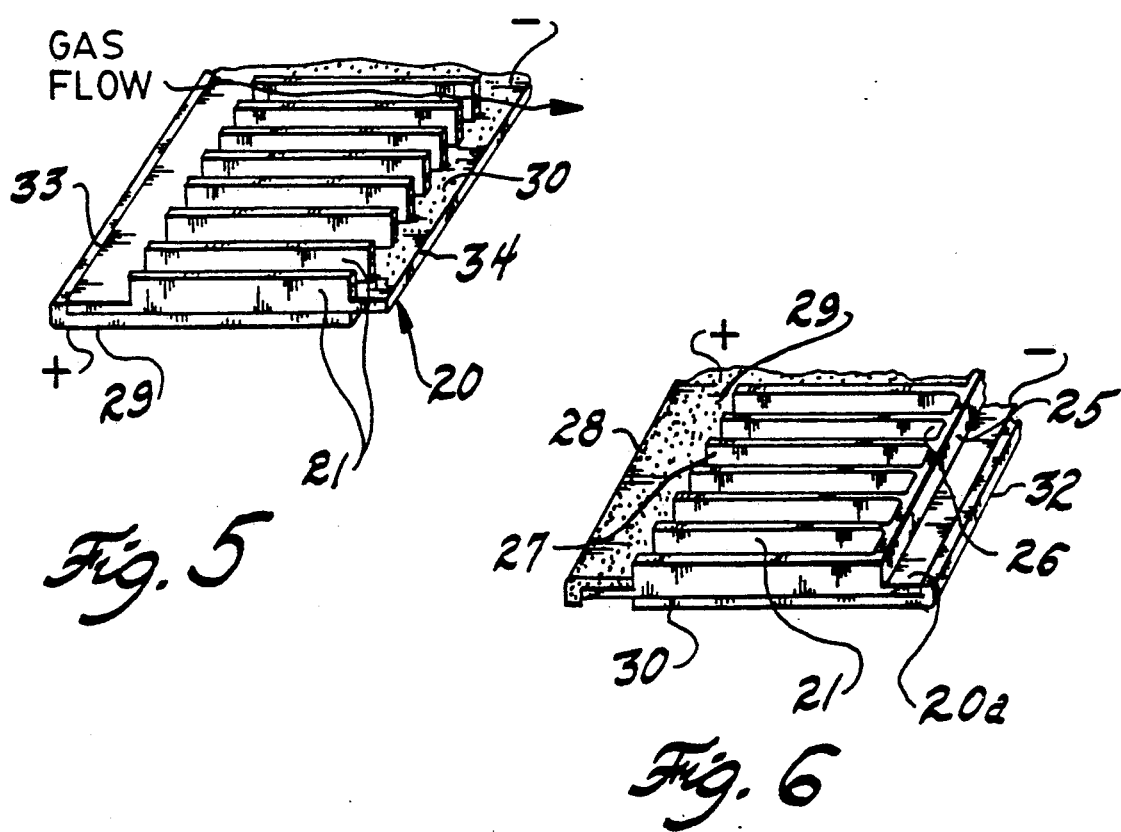
Fig. 5
Fig. 6

ELECTROCHEMICAL PROCESS AND APPARATUS FOR REDUCING OXIDANTS OF VEHICLE INTERIOR AIR

BACKGROUND OF THE INVENTION

1. Technical Field

This invention relates to the technology of cleansing environmental air of noxious gaseous elements, and more particularly to techniques for removing such elements from the passenger compartment of an automobile with equipment carried on-board such vehicle.

2. Discussion of the Prior Art

Oxidants, which may include ozone, nitrogen dioxide, peroxy nitrates (such as PAN), can have long-term injurious effects on occupants of a vehicle. U.S. Pat. No. 4,184,983 describes the desirability of eliminating ozone from the atmosphere in general by certain techniques used to the date of the patent (1978). Recently, it has been appreciated that the problem of oxidant concentration may be increased inside automobiles when traveling on congested roads at speeds of less than 25 mph.

Prior art techniques for cleansing noxious emissions from the exhaust of engines or combustion processes of plants have progressed from using noncatalytic absorbants to the use of catalytic materials that chemically decompose or reduce such oxidants to nonpollutants. The use of noncatalytic absorbents is represented in U.S. Pat. No. 3,870,495 (1972) wherein random woven fibers carrying charcoal are used to cleanse the air intake of an interior compartment of a vehicle. In U.S. Pat. No. 4,184,983 (1980), a catalytic metal or metal oxide comprised of platinum, palladium, ruthenium, rhodium, osmium, or iridium is supported on refractory inorganic oxides such as alumina. The use of catalytic materials for chemical decomposition have included: U.S. Pat. No. 2,298,607 (1942), using precious metal or metal oxides on a glass wool support; U.S. Pat. No. 4,184,983, which uses a catalytic metal or metal oxide comprised of one or more of platinum, palladium, ruthenium, rhodium, osmium, iridium, supported on a refractory inorganic oxide such as alumina; PCT International Application WO85 01,704 (Oct. 11, 1983), to H. Heinz et al, describing removal of toxic pollutants entering a motor vehicle compartment by use of chemisorption filters which have catalytic materials thereon but which require preheating of air to be treated before contact by the catalyst; UK Patent Application GB 2,122,103 (Jan. 11, 1984), to M. Yamamoto et al (Toyota Central Research and Development Laboratories), describing purifying air for passengers in automobiles by simultaneous oxygen enrichment along with the use of a filter carrying films of plasma polymer of hexamethyldisiloxane to remove nitrogen and particulate pollutants; and German Offen. DE 3,740,091 (Jun. 15, 1989), describing a zig-zag shaped filter carrying catalytic material on a thermoplastic body to transform pollutants in the intake air to harmless substances.

To eliminate the need for replacement of absorbents which are consumed in the cleansing process of intake air to vehicles, U.S. Pat. No. 3,616,339 proposed the use of an electrochemical apparatus to selectively oxidize contaminants, such as ketones, butanol, toluene, etc., by the use of an ion exchange electrolyte supported on glass fibers, paper or polymeric material and by the use of electrodes, the positive electrode being comprised of lead oxide, bismuth, or antimony, and the negative electrode being comprised of graphite or precious metal such as palladium, rhodium, or platinum. The apparatus did not require any positive movement of air and gave no indication of the voltage that was required for operating the electrolytic cell.

It is a goal of this invention to selectively remove oxidants by reduction from the fresh air intake of a ground transport motor vehicle and to do so by use of an electrolytically generated reducing condition at the negative electrode that permits reduction of the undesirable oxidants. Such process and apparatus need not require heating of the air nor does it significantly remove desirable gases such as oxygen.

SUMMARY OF THE INVENTION

A nonporous, hydrophilic, insoluble electrolyte, or a porous insulating material with its pores filled with a nonporous, hydrophilic, insoluble eletrolyte, is used to electrochemically produce a reducing condition at a negative electrode from the moisture in the electrolyte and to reduce oxidants by catalyzed reduction of the oxidant. Possible reactions are shown in FIG. 1. More particularly, the method aspect of this invention comprises an electrochemical technique for selectively reducing objectionable gaseous oxidants of a ground vehicle interior space at ambient temperature and pressures, comprising: (a) applying a constant current with a low voltage to an electrochemical cell comprised of a positive catalyzed electrode and a negative catalyzed electrode, each separated by a hydrophilic, insoluble, cationic exchange electrolyte therebetween containing moisture, said cell being effective to produce a reducing condition at the negative electrode; and (b) moving air of said vehicle interior across the negative electrode to reduce the oxidants and form water as a byproduct.

Preferably, the catalyst for said positive electrode must be capable of electrochemically producing oxygen, and may be selected from the group consisting of carbon, silver, conductive inorganic oxides, or noble metals; the catalyst system for the negative electrode must be capable of electrochemically reducing ozone or nitrogen dioxide (to NO) but produce very little oxygen, and may be selected from the group consisting of (i) large pore carbon containing either an inorganic iodide or ferrous phosphate or other appropriate ferrous salt in the large pores, or (ii) titanium doped iron oxide. The cationic exchange electrolyte must be a protonic conductor, that is capable of absorbing water, and may be selected from the group consisting of sulfonated polystyrene or a perfluorinated ion exchange material such as Nafion. Preferably, the applied voltage is at or below that at which hydrogen gas starts to be kinetically evolved on the electrode surface, and is preferably in the range of 1.3 to about 2 volts. The amount of hydrogen that may be produced should preferably be regulated by means of current control in an amount to keep the amount of $H_2$ in the air flow stream below about 50 ppm. The voltage should be below that at which oxygen is rapidly reduced for the electrode used, but at which $O_3$ and $NO_2$ are reduced by the catalyst electrode system.

The apparatus aspect of this invention comprises providing a device for reducing the concentration of gaseous oxidants in the interior passenger space of a ground vehicle, comprising: (a) an oxidant decomposition catalyst cell consisting of a hydrophilic insoluble cationic electrolyte separating a catalytic positive electrode and a catalytic negative electrode; (b) air blower means effective to selectively move air for the passenger space across the negative electrode of said catalyst; and (c) means for supplying a current with a low voltage to the catalyst cell at a voltage level below that at which undesirable amounts of hydrogen gas evolve and below that at which oxygen is rapidly reduced. The amount of hydrogen that may appear in the air stream is kept less than about 50 ppm by limiting the electric current to a value commensurate with the air flow rate.

Preferably, the catalyst cell has a cylindrically shaped honeycomb type carrier with parallel axially extending passageways. A portion of such passageways (those containing the positive electrode) are blocked against through-flow while the other passageways, containing the negative electrode, permit through-flow. The carrier is advantageously formed of superimposed sheets, rolled up with interleaved corrugations, each having a series of parallel transverse ribs extending from one side of the strip to define the corrugations. Certain strips have a continuous edge flange to block the passageway against flow when rolled into its final configuration. For the positive electrode, catalyst material is applied to the area between the ribs of the strip containing the edge flange which block the air flow, and extend to the area of the strip that does not contain any ribs and around the edge of that strip so as to make contact with the porous positive current pressed against that side of the honeycomb. The positive electrode is also applied in the same manner, but to the smooth back of the blocked flow strip and between the ribs of the adjacent flow-through strip.

The means for applying the current may include a distributor disk constituted of very porous deformable electronic conductor pressed against the ends of the rolled cylinder to selectively conduct a current so that it flows between each of the respective positive and negative electrodes. Such disks could be made from porous metal felt or porous carbon or graphite felt.

SUMMARY OF THE DRAWINGS

The novel features of the invention are set forth with particularity in the appended claims. The invention itself, however, both as to its organization and method of operation, together with further objects and advantages thereof, may, best be understood by reference to the following description taken in conjunction with the accompanying drawings, in which:

FIG. 4 is a schematic view of a stage of fabrication of the eletrochemical cell of FIG. 2;

FIGS. 5 and 6 are perspective views of fragmentary portions of the corrugated layers illustrated in FIG. 4.

DETAILED DESCRIPTION AND BEST MODE

Ozone, which is found in the atmosphere of the earth, may, in low levels of concentration such as 0.05-0.10 ppm, cause sensory irritation in humans, and higher concentrations, such as from about 0.20-2.0 ppm, may cause severe reactions such as impaired respiration, chest pains, extreme fatigue, as well as chronic coughing and even lung lesions. Although natural levels of ozone may range from about 0.01-0.03 ppm or less, it is becoming increasingly concentrated when air pollution occurs. This is especially true in certain geographical locations, such as in Los Angeles, where air circulation is limited, or near high voltage electrical equipment, ultraviolet sources, or arc welding operations. The ozone layer which is normally present in the upper, atmosphere has been found to be close to the earth and therefore high ozone levels have been found in aircraft flying at elevations in excess of 35,000 feet.

Other undesirable oxidants may be present in ground-level atmospheres, thus being drawn into the passenger compartment of an automobile; these may include nitrogen dioxide and peroxy nitrates. In the Los Angeles area of the United States, nitrogen dioxide can exist as high as 0.5 ppm but usually is in the range of 0.04–0.24 ppm. Peroxy nitrates can be as high as 50 ppm but are usually in the range of 2-20 ppm, and can occur in aerosol particles.

This invention has discovered a method and apparatus useful for converting objectionable oxidants which are admitted to the passenger compartment of a automotive vehicle. The method aspect comprises conversion of such oxidants by allowing such oxidants to be reduced at the negative electrode catalyst system of an electrolytic cell which uses low voltage source.

More particularly, the method of this invention comprises: (i) applying a constant current with a low voltage to an electrochemical cell comprised of a positive catalyzed electrode and a negative catalyzed electrode, each separated by a hydrophilic insoluble cationic exchange electrolyte therebetween containing moisture, the cell being effective to produce a reducing condition at the negative electrode; and (ii) moving air for the vehicle interior onto and by the negative electrode to reduce the oxidants and form water as a byproduct while exposing quiescent air to the positive electrode where oxygen is made.

The voltage source may be that drawn from a 12 volt battery conventionally utilized with such automotive vehicle and the voltage is preferably in the range of 1.3 to about 2 volts, the current flowing from the positive to the negative electrode through the electrolyte.

Figure 1:
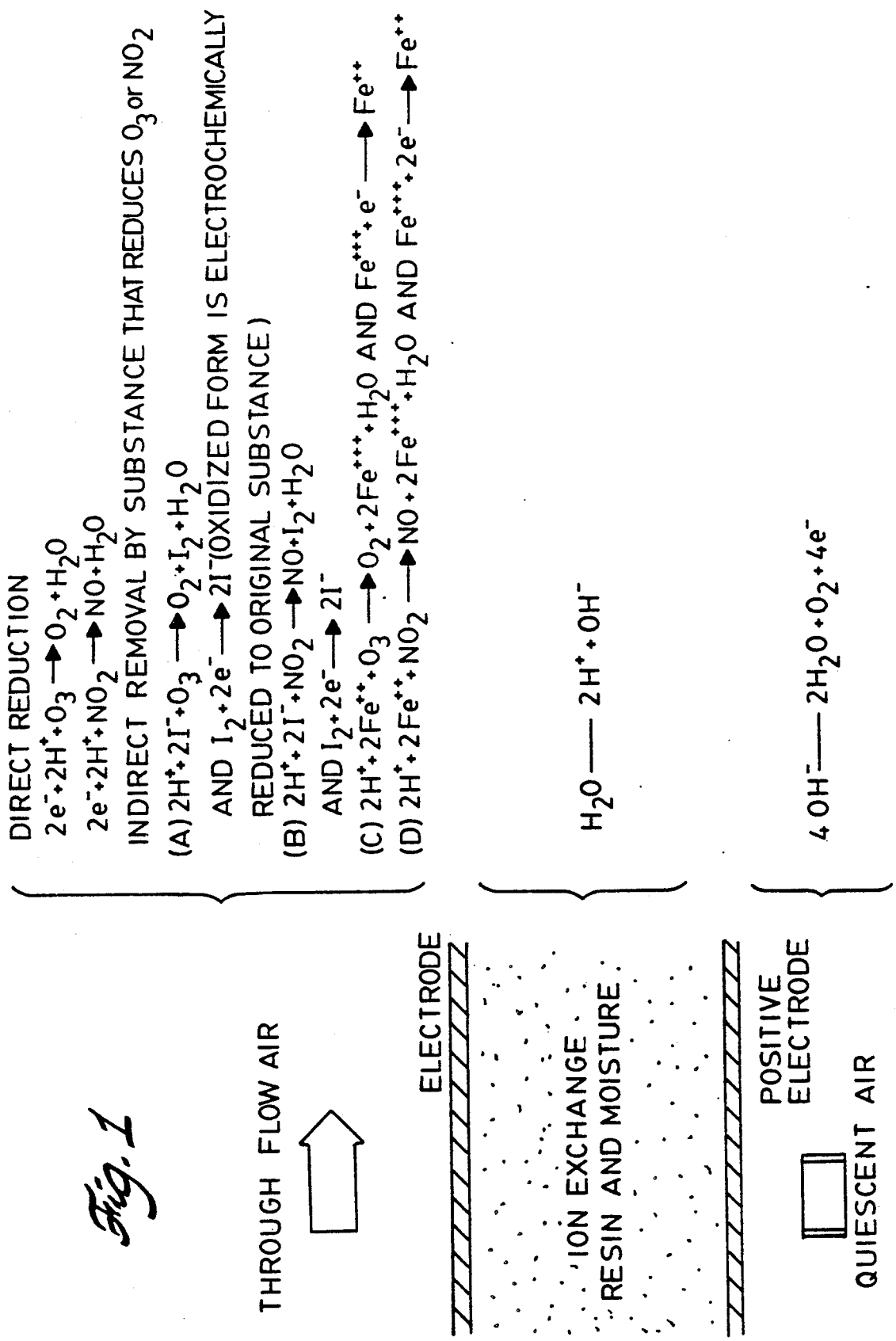
FIG. 1 is a diagramatic illustration of the electrochemical cell of this invention with associated reactions.

As shown in FIG. 1, the reactions that take place within the electrolyte comprise the dissociation of water (moisture) into hydrogen ions and hydroxide ions. The hydrogen ions migrate to the negative electrode; the negative OH ions migrate to the positive electrode. At the negative electrode, the hydrogen ion and an electron produce a reducing condition so that a through-flow of vehicle air causes the reactant to combine with undesirable oxidants to form water and a converted compound. The hydrogen ions combine with ozone to form water and oxygen, nitrogen dioxide to form water and nitrogen monoxide. The homogenous noncatalytic reoxidation of NO to $NO_2$ by oxygen is very slow. At the positive electrode where electrons are removed, the OH ions combine to form water and oxygen radicals which eventually agglomerate to form free oxygen. The voltage must be in a range that is at or below that at which free hydrogen starts to be evolved and below that at which free oxygen is rapidly reduced at the negative electrode surface utilized. Additionally, hydrocarbon particulates may be separated from the air passing through the device by use of filters in combination herewith.

Figure 2:
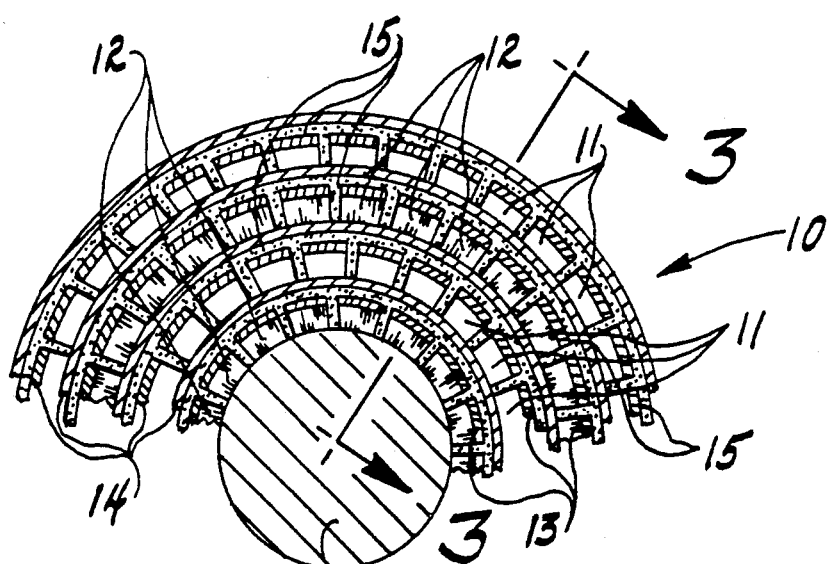
FIG. 2 is a cross-sectional view of a portion of a catalyst cell for an automobile embodying the principles of this invention.
Figure 3:
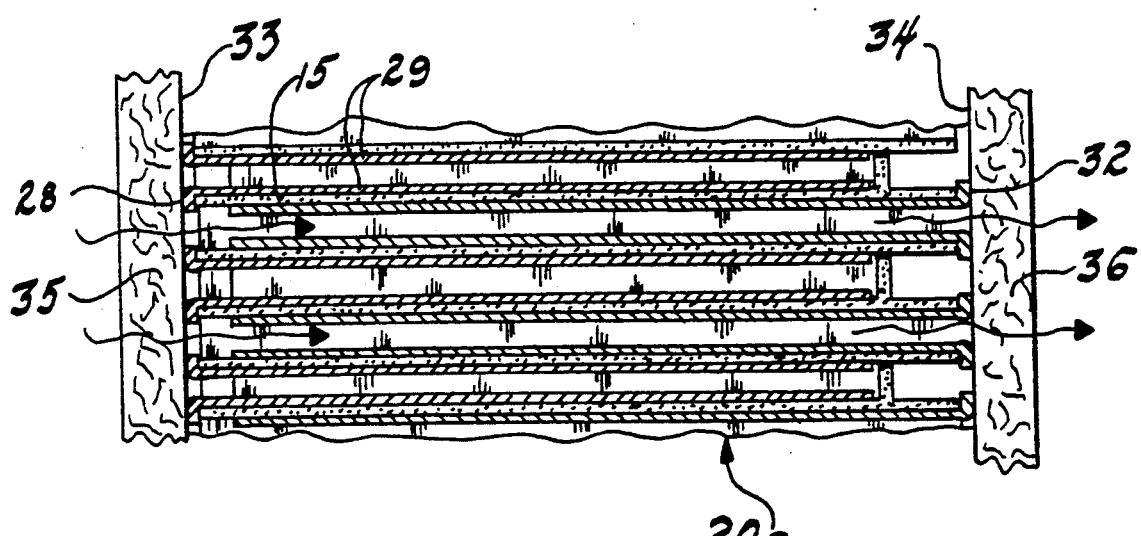
FIGS. 3 is a sectional view taken along lines 3—3 of FIG. 2.

Turning to FIGS. 2-3, the oxidant decomposition honeycomb structure 10 may comprise any acid resistant material such as an acid resistant plastic. The material itself must be a hydrogen ion conductor or its walls must be porous with continuous pores from one side to the other filled with a hydrogen ion conductor. The device may be formed as a cylinder containing a plurality of parallel axial passageways of the type that can be characterized as a honeycombed structure. This honeycomb structure, however, should have a series of pass-through passageways 11 and an interleaved series of plugged passageways 12 which contain quiescent air. The compartment air to be purified is passed through flow-through passageways 11. The electric current is passed from the positive electrode 13 to the negative electrode 14 through an ionic conductor 15. The ionic conductor must be one which meets the following characteristics: hydrophilic with a very low solubility in water, conducts hydrogen ions, and is preferably selected from the group consisting of sulfonated polystyrene or perfluorinated hydrogen ion resin similar to Nafion. The catalytic system associated with the negative electrode must provide the following characteristics: electronically conducts, promotes the electrochemical reduction of undesirable oxidants, and at the same time is a very poor catalyst for the electrochemical reduction of oxygen; it is preferably selected from the group consisting of graphite and large pore carbon containing silver iodide (AgI), or ferrous phosphate or titanium doped iron oxide. The positive electrode must be adequately active for the electrochemical evolution of oxygen; it is preferably selected from the group consisting of carbon, silver, Li doped NiO.

As illustrated in FIGS. 4-6, a preferred method of fabricating the electrochemical cell 10 comprises rolling up a series of interleaved sheets or strips 20, each constituted of a nonporous hydrophilic insoluble protonic conducting material such as sulfonated polystyrene. Alternatively, the sheets may be of a porous material with the pores continuous from one side to the other and with the pores filled with an ion conducting material such as a hydrophilic organic hydrogen ion conductor. A hydrophilic insoluble ionic conductor is desirable since the source of oxygen evolved at the positive electrode will be water and is further desirable because the material does not dry out and crack when exposed to dry conditions. Furthermore, being insoluble, it does not leach out under conditions of very high humidity.

The roller method requires such strips 20, of plastic, to have short legs or ribs 21 projected outwardly from one side only to separate the strips from one another by essentially the distance 23 of the leg or rib. Essentially, the ribs or legs create a corrugation. Thus, when such interleaved strips 20 are rolled up about a rigid mandrel 22, there is created a structure with many small passageways parallel to the cylinder axis 24. Certain of the plastic strips (20a) have their passageways plugged at one side. This is created by having such strips 20a provided with an edge flange 25 along the longitudinal extent thereof which when rolled up creates a blockage to flow passing through the spaces along the ribs 21.

Preferably, the strips 20 are wider than the layout of the ribs so as to aid in electric current distribution between the negative and positive electrodes. As indicated above, strips 20a have a continuous edge flange 25 to block the passageway against flow when rolled into its final configuration. For the positive electrode, catalyst material is applied to the area between the ribs of the strip 20a containing the edge flange 25 which blocks the air flow, and extends to the area 27 of the strip that does not contain any ribs (which is the area on the other end of the honeycomb from the end 26 containing the blocking flange), and around the edge 28 of the strip at this end so as to make contact with the porous positive current collector pressed against that end of the honeycomb. Positive electrodes are also applied to the back of the adjacent flow-through strip 20 (the side with no ribs), and extend to and around the edge 23 of the strip 20 (on the same end of the honeycomb as the positive electrode that was put between the ribs of the strip containing the blocking flange). This results in all of the positive electrodes being extended to and coated on one edge of the honeycomb strips.

In the same manner, the negative electrode is applied between the ribs of the adjacent flow-through strip 20 and to the back of the blocked flow strip 20a (the side that does not have ribs). These negative electrodes extend to and around the end 26 of the honeycomb that is opposite the end 27 containing the positive electrodes.

In FIG. 6, the catalyst electrode material is applied to the strips prior to winding or coiling. The strips 20a, with passageways plugged, have a positive electrode material 29 applied between the ribs, starting from the plugged side 26 and running the length the rib and extending out of the unplugged side 27 to and over the edge 28 of the strip. These strips 20a also have a negative electrode material 30 applied to the back of such strips where there are no ribs, starting from a few millimeters from the edge 28 to and over the edge 32 of the strip. In FIG. 5, strip 20 is provided with negative electrode material 30 between the ribs and positive electrode material 29 on the back, starting spaced from edge 34 and running over the edge 33.

Porous graphite or metal conductor plates 35, 36 acting as collector contacts are used. As shown in FIG. 3, one (35) is pressed on one end of the coiled cylinder and one (36) is pressed against the other end of the coiled cylinder to respectively engage the positive and negative electrodes. Suitable conductors are connected between such contacts to promote the supply of current between the positive and negative electrodes.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. An electrochemical method for selectively reducing gaseous oxidants of ozone, $NO_2$, or peroxy nitrate contained in the air of a vehicle interior space at ambient temperature and pressure, comprising:
    (a) applying a constant current with a low voltage to an electrochemical cell comprised of a positive catalyzed electrode and a negative catalyzed electrode separated by a hydrophilic, protonic hydrogen ion conductor electrolyte therebetween containing moisture, said cell being effective to produce a reducing condition at said negative electrode by a concentration of hydrogen ions thereat; and
    (b) moving said oxidant laden air, for said vehicle interior space, across said negative electrode to reduce said oxidants and form water as a by-product.

2. The electrochemical method as in claim 1, in which said catalyst for said negative electrode is selected from the group consisting of titanium doped iron oxide and a mixture of graphite and large pore carbon containing an inorganic iodide or ferrous phosphate.

3. The electrochemical method as in claim 1, in which said electrolyte is insoluble and is nonelectron conductive.

4. The electrochemical method as in claim 3, in which said electrolyte is a resin.

5. The electrochemical method as in claim 1, in which said electrolyte is selected from the group consisting of sulfonated polystyrene or perfluorinated hydrogen ion exchange membrane.

6. The electrochemical method as in claim 1, in which said low voltage is below that at which hydrogen gas is evolved in an amount that would give about 50 ppm in the air stream, and below that at which free oxygen is rapidly reduced at the negative electrode.

7. The electrochemical method as in claim 6, in which said voltage range is between 1.3 to about 2 volts.

8. The electrochemical method as in claim 1, in which no electric current is applied unless an air flow fan is turned on and positive air flow movement is created.

9. The electrochemical method as in claim 1, in which the reduction of said oxidants is effected by using reduced inorganic species at the negative electrode to selectively reduce said undesirable oxidants but to reduce very little oxygen, such selectivity being assured by (i) constituting said negative electrode of at least one of titanium doped iron oxide or a mixture of graphite and large pore carbon containing an inorganic iodide or ferrous phosphate, and (ii) maintaining the electrode voltage to be sufficiently low to avoid rapid depolarization by oxygen.

10. An apparatus for reducing the concentration of gaseous oxidants of ozone, $NO_2$, or peroxy nitrate contained in the air of the interior passenger space of an automobile, comprising:
   (a) an oxidant decomposition cell consisting of a hydrophilic, protonic hydrogen ion conductor electrolyte separating a catalytic positive electrode and a catalytic negative electrode;
   (b) air blower means effective to selectively move air of the passenger space across said negative electrode; and
   (c) means for supplying a low voltage to said cell at a voltage level at or below which free hydrogen gas starts to evolve, and below the voltage at which free oxygen gas is rapidly reduced at the negative electrode.

11. The apparatus as in claim 10, in which the electrolyte comprises a honeycomb carrier having at least one wall containing pores, extending through said wall, filled with a hydrophilic ion exchange resin to serve as said electrolyte.

12. The apparatus as in claim 11, in which said honeycomb carrier is a cylinder having parallel axially extending passageways with a portion of said passageways blocked against flow when adjacent the positive electrode.

13. The apparatus as in claim 12, in which said means for moving air is effective to do so axially through only flow-through passageways of said carrier.

14. The apparatus as in claim 10, which further comprises filter means to separate out aerosol particulates.

15. The apparatus as in claim 10, in which a series of such electrochemical cells are employed to form common composite electrochemical cells.

16. An apparatus for reducing the concentration of gaseous oxidants of ozone, $NO_2$, or peroxy nitrate contained in the air of the interior passenger space of an automobile, comprising:
   (a) an oxidant decomposition cell consisting of hydrophilic, protonic hydrogen ion conductor electrolyte separating a catalytic positive electrode and a catalytic negative electrode, the electrolyte comprising a honeycomb carrier having at least one wall containing pores, extending through said wall, filled with hydrophilic ion exchange resin to serve as said electrolyte, said honeycomb carrier being a cylinder having parallel axially extending passageways with a portion of said passageways blocked against flow when adjacent the positive electrode, said passageways formed as a result of interleaving corrugated sheets of material resistant to acid and rolling up said interleaved sheets to form said cylinder with such passageways in an axial direction of the rolling;
   (b) air blower means effective to positively and selectively move air of the passenger space across said negative electrode; and
   (c) means for supplying low voltage to said cell at a voltage level at or below which free hydrogen gas starts to evolve, and below the voltage at which free oxygen gas is rapidly reduced at the negative electrode.

17. The apparatus as in claim 16, in which each corrugated sheet has a series of parallel transverse ribs expending from a side of the strip, one strip having an edge flange to block access flow transversely between the sides of such strip.

18. The apparatus as in claim 17, in which a layer of catalyst material for the positive electrode is applied between the ribs of the sheet containing said flange, and the catalyst material for the negative electrode is applied to smooth back of such sheet.

19. The apparatus as in claim 16, in which said sheets of material are selected from the group consisting of plastic containing pores filled with a perfluorinated ion exchange membrane of perfluroinated hydrogen ion resin or sulfonated polystyrene.

20. The apparatus as in claim 16, in which said sheets are comprised of sulfonated polystyrene.

21. The apparatus as in claim 16, in which said current is applied to said electrodes by current distributors in the form of porous deformable electronically conductive disks pressed against the ends of said cylinder to selectively conduct current to the respective electrodes.

* * * * *